United States Patent
Lutz

(10) Patent No.: US 6,675,946 B2
(45) Date of Patent: Jan. 13, 2004

(54) ADJUSTABLE AUXILIARY CONVEYOR

(76) Inventor: David W. Lutz, 1223 Dickenson Dr., Carlisle, PA (US) 17013

( * ) Notice: Subject to any disclaimer, the term of this patent is extended or adjusted under 35 U.S.C. 154(b) by 0 days.

(21) Appl. No.: 10/049,121

(22) PCT Filed: Mar. 28, 2001

(86) PCT No.: PCT/US01/09927
§ 371 (c)(1),
(2), (4) Date: Feb. 8, 2002

(87) PCT Pub. No.: WO02/051726
PCT Pub. Date: Jul. 4, 2002

(65) Prior Publication Data
US 2002/0112937 A1 Aug. 22, 2002

Related U.S. Application Data
(60) Provisional application No. 60/257,582, filed on Dec. 22, 2000.

(51) Int. Cl.[7] .............................................. B65G 13/00
(52) U.S. Cl. ................. 193/35 TE; 198/861.1
(58) Field of Search ................. 193/35 TE; 198/861.1, 198/812, 594

(56) References Cited

U.S. PATENT DOCUMENTS

| | | | | |
|---|---|---|---|---|
| 2,613,789 A | * | 10/1952 | McLaughlin | 193/35 TE |
| 2,760,617 A | * | 8/1956 | Bowen | 193/35 TE |
| 3,263,951 A | * | 8/1966 | Stokes | 198/861.1 X |
| 5,078,250 A | * | 1/1992 | Cole | 198/861.1 X |
| 6,068,111 A | * | 5/2000 | Smith et al. | 193/35 TE |

FOREIGN PATENT DOCUMENTS

| | | | | |
|---|---|---|---|---|
| CA | 670911 | * | 9/1963 | 193/35 TE |
| JP | 2-33015 | * | 2/1990 | 193/35 TE |

* cited by examiner

Primary Examiner—James R. Bidwell
(74) Attorney, Agent, or Firm—Webb Ziesenheim Logsdon Orkin & Hanson, P.C.

(57) ABSTRACT

A conveyor 10 is provided having a frame 12 with a first side and a second side. At least one extensible and retractable support 36 extends between the first and second sides such that a distance between the first and second sides is selectively adjustable. At least one conveyor tack 76 is removably carried on the frame 12.

10 Claims, 4 Drawing Sheets

ADJUSTABLE AUXILIARY CONVEYOR

This application claims the benefits of provisional application 60/257,582 filed Dec. 22, 2000.

BACKGROUND OF THE INVENTION

1. Field of the Invention

The present invention relates generally to conveyor systems and, more particularly, to a gravity auxiliary conveyor for transporting containers, particularly industrial totes and boxes, to a workstation.

2. Technical Considerations

An ongoing need in industrial applications which utilize a limited production space production line is to provide an efficient and inexpensive way of delivering parts to the production process. Production lines, as for example in the automobile industry, require a large number of individual parts to be delivered to a workstation at the line for incorporation into the product being manufactured. Automated over/under line feed systems have been developed to maximize assembly line parts handling efficiency. These automated over/under line feed systems provide an uninterrupted flow of parts carried in containers or racks. The individual workers at the workstation take parts from the delivery container of rack and install them in the work product in progress, as for example, a car. An example of a conventional line feed system is disclosed in U.S. Pat. No. 4,977,999.

In many production lines, it is not unusual for the work product to undergo several design changes or modifications during the product's commercial lifetime. In which cases, it is necessary to provide the production line worker with different or new components or a different number of components for which the original over/under line feed system may not have been designed or dimensioned to accommodate. Often, these new components take the form of small pats which, if not able to be delivered via the original over/under line feed system, are typically delivered to the worker in separate pallets or boxes that are left at the workstation. Thus, during the production process, the worker must not only select pans delivered through the original line feed system but must also select additional parts from the pallets delivered to the workstation. This practice tends to clutter the workstation. Additionally, requiring the worker to pick parts out of the pallets on the floor is tiring and not ergonomically desirable. Replacing the over/under line feed system with a new system designed to accommodate the new parts is not typically an option due to the high cost of such systems. And, even if a new system was installed, there is no guarantee that the work product will not undergo additional modifications or changes requiring further design changes to the line feed system.

Therefore, it would be advantageous to provide a conveyor system and method of delivering parts to a production line workstation which reduce or eliminate at least some of the drawbacks discussed above.

SUMMARY OF THE INVENTION

Figure 1:
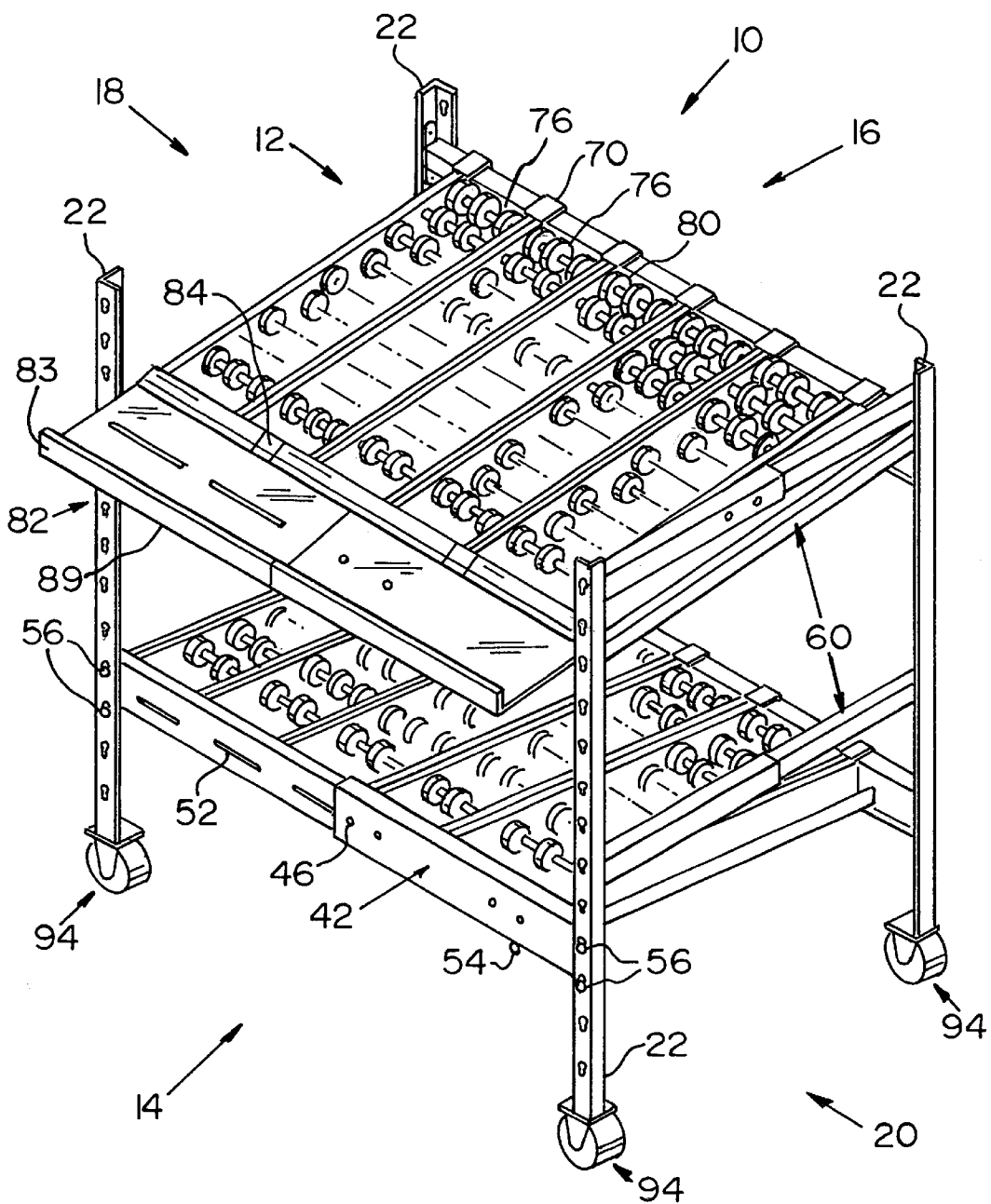
FIG. 1 is a perspective view of an assembled auxiliary conveyor of the invention.

A conveyor of the invention is formed by a frame having a first side and a second side. At least one extensible and retractable support extends between the first and second sides such that a distance between the first and second sides is selectively adjustable. At least one conveyor track is removably mounted on the frame.

Another auxiliary conveyor of the invention includes a frame having a pair of spaced apart front legs and a pair of spaced apart back legs, with each leg having at least one attachment element. At least one extensible ad retractable front support extends between the front legs and at least one extensible and retractable back support extends between the back legs. Each support includes at least one engagement member configured to releasably engage an attachment element on one of the legs such that the positions, e.g., height, of the front and back extensible and retractable supports on the legs is adjustable. At least one conveyor track is removably mounted on the conveyor frame and at least one side rail extends between each pair of front and back legs. Each side rail includes at least one engagement member configured to releasably engage an attachment element on one of the legs.

A further conveyor includes a frame having a pair of spaced apart front legs and a pair of spaced apart back legs, wit each leg having a plurality of attachment elements. A plurality of extensible and retractable front supports extend between and are releasably engageable with the front legs. Each front support includes at least one engagement member at each end configured to releasably engage an attachment element on one of the front legs. A plurality of extensible and retractable back supports extend between and are releasably engageable with the back legs. Each back support includes at least one engagement member at each end configured to releasably engage an attachment element on one of the back legs. At least one side rail extends between and is releasably engageable with each pair of front and rear legs. At least one track bracket is releasably engaged with each front and back support. At least one conveyor track extends between each pair of font and back supports and is configured to engage the track brackets.

DESCRIPTION OF THE INVENTION

As used herein, spatial or directional terms, such as "left", "right", "front", "back", and the like, relate to the invention as it is shown in the drawing figures. However, it is to be understood that the invention may assume various alternative orientations and, accordingly, such terms are not to be considered as limiting. Further, as used herein, all numbers expressing dimensions, physical characteristics, and so forth, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of the minimum value of 1 and the maximum value of 10; that is, all subranges beginning with a minimum value of 1 or more and ending with a maximum value of 10 or less, e.g., 5.5 to 10.

The structural components of an exemplary conveyor incorporating features of the invention will first be described and then the use of the conveyor to practice an exemplary method of the invention will be described. It is to be understood that the specifically disclosed conveyor and method are presented simply to explain the general concepts of the invention and that the invention is not limited to these specific embodiments.

Figure 2:
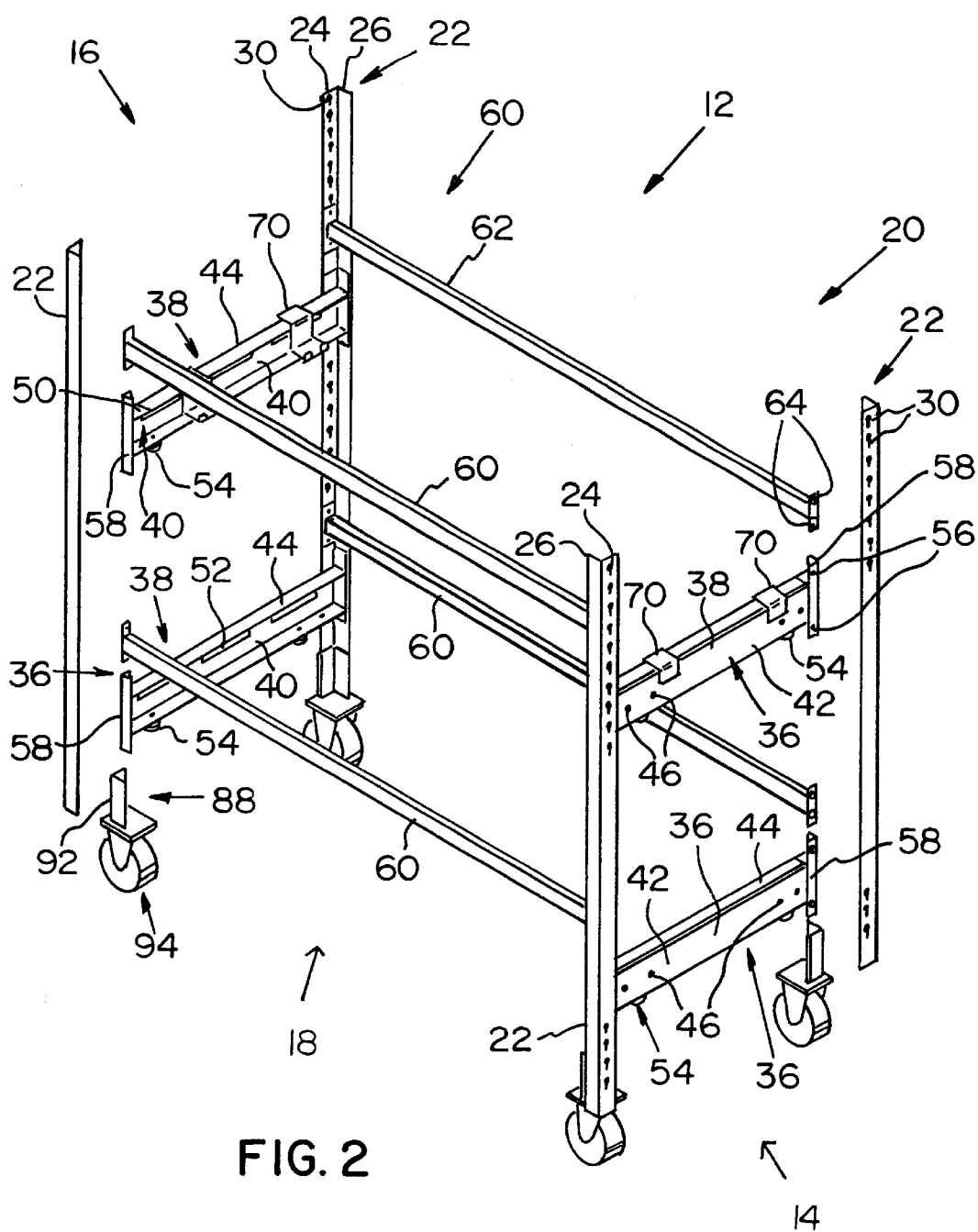
FIG. 2 is a perspective, partially exploded view of a conveyor frame of the invention.

As shown particularly in FIGS. 1 and 2, an exemplary auxiliary conveyor 10 of the invention includes an expandable, adjustable, and reconfigurable frame 12. For purposes of the following discussion, the exemplary conveyor 10 and frame 12 shown in FIGS. 1 and 2 will be described as having a front 14, a back 16, a left side 18, and a right side 20. However, it is to be understood that these directional terms are for explanation purposes only and such terms are not to be considered as limiting to the invention.

Figure 3A:
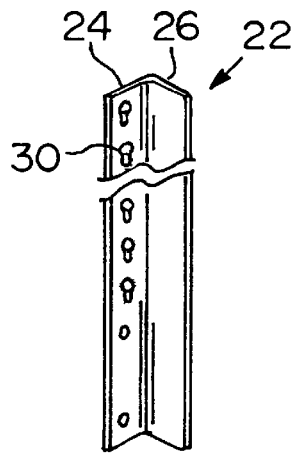
FIGS. 3A–3J show some of the individual components (not to scale) that can be combined to form the auxiliary conveyor of FIG. 1.
Figure 3B:
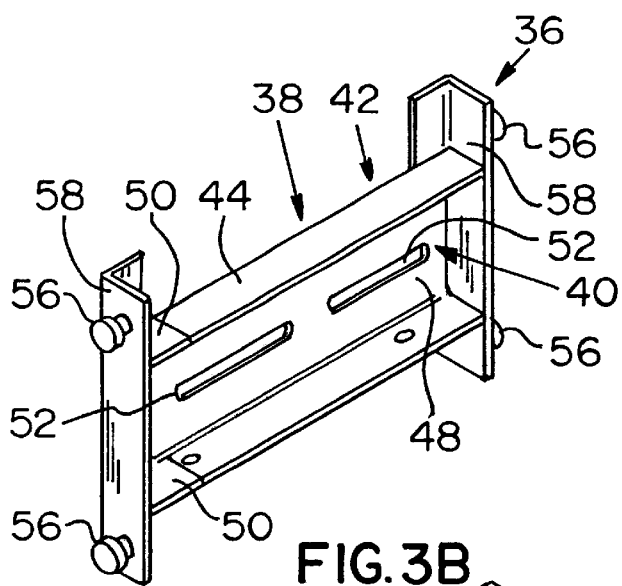
Figure 3D:
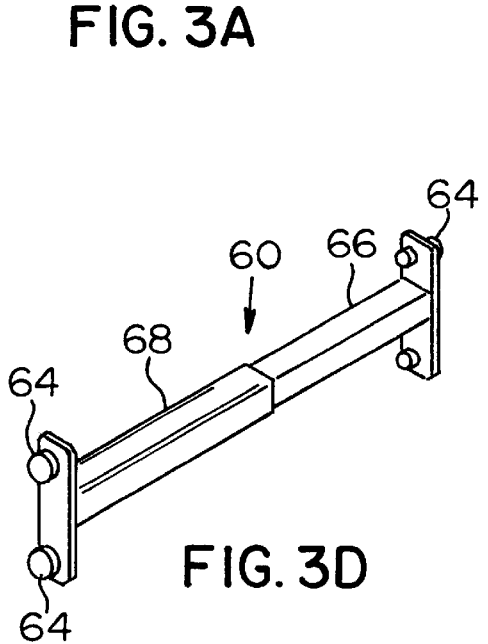
Figure 3C:
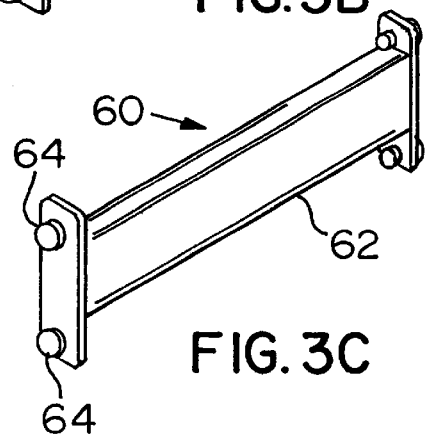
Figure 3E:
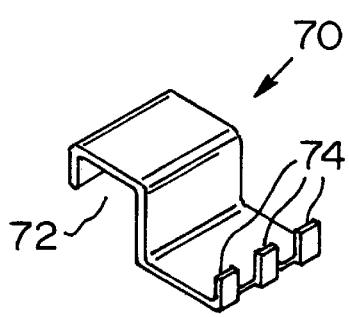
Figure 4:
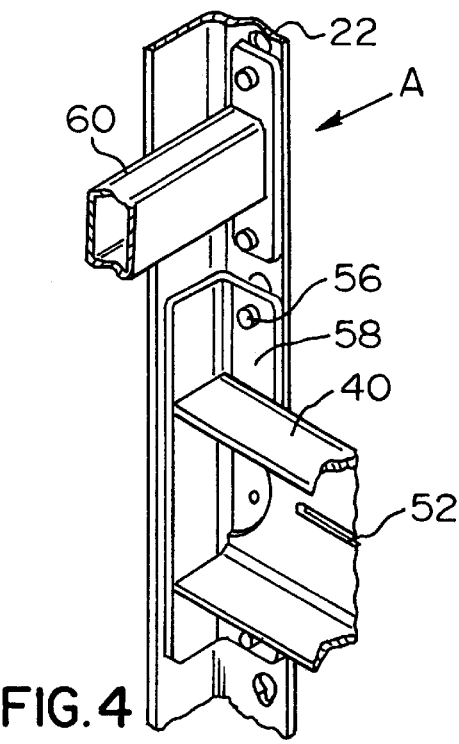
FIG. 4 is a partial perspective view of an exemplary connecting arrangement between the components of the conveyor frame of FIG. 2.
Figure 5:
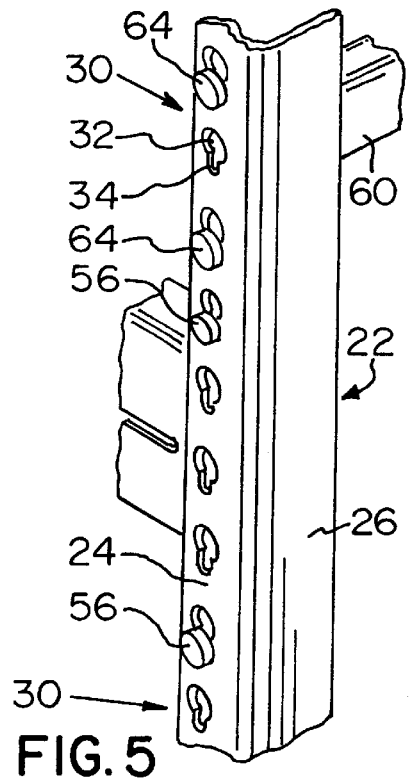
FIG. 5 is a view of the connecting arrangement of FIG. 4 as seen in direction A in FIG. 4.

As shown in FIGS. 1–3A, the frame 12 has a plurality of supports or legs 22 preferably made of rigid material, such as plastic or metal, e.g., aluminum, steel, etc. In the exemplary embodiment shown in FIGS. 1 and 2, the legs 22 are substantially L-shaped in cross section having a first part 24 extending at a substantially right angle to a second part 26. A plurality of spaced attachment elements 30 are carried on or formed on the legs 22, e.g., on at least one of the parts 24 or 26, e.g., the first part 24. For example, as shown in FIGS. 2, 4, and 5, the attachment elements 30 can be configured as eye-slots having a larger diameter area 32 adjacent a smaller diameter area 34. However, many suitable conventional attachment system, e.g., bolt holes, hooks, bayonet mounts, etc., could be used. The legs 22 can be made of a single piece or, if desired, the legs 22 can be extensible and retractable, e.g., formed by two or more telescoping or mutually slidable pieces that can be selectively locked in any conventional manner to adjust the length of the legs 22. This locking can be done in any conventional manner, such as but not limited to pins or bolts passing through aligned holes in the leg pieces, friction clamps, etc.

Looking at the front 14 of the frame 12, at least one and preferably more than one front support or load beam 36 extends between and is releasably connected to or engageable with the left and right front legs 22. For example, a lower load bean 36 can be positioned near the bottoms of the front legs 22 and an upper load beam 36 can be located above the lower load beam 36. As shown in FIGS. 1, 2, and 3B, each beam 36 is preferably extensible and retractable, e.g., is telescopic, adjustable, or movable between a first, retracted position and one or more second, elongated or expanded positions. In one exemplary embodiment, the beam 36 can be formed by a substantially U-shaped outer member 38 and a substantially U-shaped inner member 40 slidable along or in the outer member 38. The outer member 38 includes a base 42 having two sides 44 extending substantially perpendicularly from the base 42. The base 42 and/or one or more of the sides 44 can include one or more bores 46, e.g., threaded bores, to engage a locking device as explained in more detail below. The inner member 40 also has a base 48 with two sides 50 extending substantially perpendicularly therefrom. The base 48 and/or one or more of the sides 50 may have one or more bores or, in one embodiment, elongated, longitudinal slots 52. The slots 52 are configured to align with one or more of the bores 46 in the outer member 38 to provide for locking the members 38, 40 at selected positions with respect to each other to change the overall length of the beam 36. Alternatively, the slots 52 can be configured as a plurality of threaded bores which can be aligned with the bores 46.

The members 38, 40 can be locked in position relative to each other by any conventional manner, such as conventional locking pins extending through holes or slots in the members 38, 40, by clamps, by threaded locking bolts or in any other desired manner. In one exemplary embodiment, a locking device 54 includes a treaded bolt having a knurled head. The bolt extends through one or more of the bores 46 and through one of the slots 52. The locking device 54 can be held in place by a nut, such as a wing nut, engaging the threads on the bolt. Alternatively, the slots 52 can be replaced by a plurality of threaded bores which can be aligned with the bores 46, which can also be threaded. The threaded bolt can engage the aligned threaded bores to lock the members 38, 40 at a selected position to determine the length of the beam 36. The length of the beam 36 is determined by the relative positions of the members 38, 40 when the locking device 54 is engaged.

As shown in FIGS. 1, 2, and 3B, at least one engagement member 56 is attached to each end of the beam 36, e.g., the inner and outer members 40, 38. The engagement members 56 can be of any desired type, egg., bolts, hooks, etc., to engage the particular attachment elements 30 on the legs 22. In the exemplary embodiment shown in FIG. 2, an end plate 58 is attached to the outer end of the outer member 38 and another end plate 58 is attached to the outer end of the inner member 40. At least one engagement member 56 is carried on each end plate 58. In this exemplary embodiment, two engagement members 56, each in the form of a post having a larger diameter outer head, are carried on each end plate 58. The engagement members 56 are configured to releasably engage the attachment elements 30 on the legs 22, as described more fully below.

At least one side rail 60 extends between each front and rear pair of legs 22, e.g., between the left front and left rear legs and between the right front and right rear legs. The side rail 60 includes a rail body 62 having engagement members 64 at each end configured to engage the attachment elements 30 of the legs 22. The engagement members 64 can be the same as the engagement members 56 of the load beams 36 or can be different. The side rail body 62 can be a unitary piece, such as a substantially L-shaped piece of metal as shown in FIG. 3C. Or, as shown in FIG. 3D, can be a telescopic or extensible and retractable member. For example, the side rail 60 can be formed from a first member 66 slidable within a second member 68 and releasably lockable in place at a selected overall length by a conventional locking device, for examples such as a locking pin, a bolt passing through the members 66, 68, etc.

As shown in FIG. 2, one or more track brackets 70 can be removably carried on the beams 36 to support one or more conveyor tracks. In the exemplary embodiment shown in FIG. 3E, each track bracket 70 has one end configured to engage the load beam. For example, one end of the track bracket 70 can be formed of a substantially U-shaped channel 72 configured to releasably engage the top of a beam 36. The other end of the track bracket 70 includes holding elements, such as fingers 74, or any type of device configured to releasably engage one or more conveyor tracks carried on the frame 12 as described below.

Figure 3F:
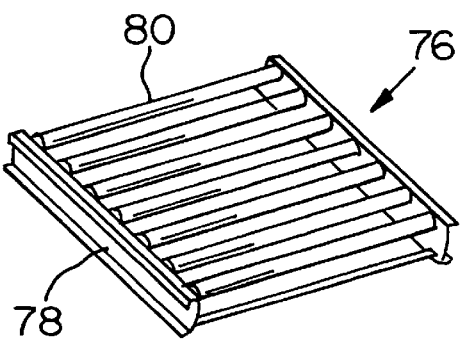

As shown in FIGS. 1 and 3F, one or more conveyor tracks 76 are removably engageable with the frame 12, i.e., are removably engageable with the track brackets 70. Each conveyor track 76 includes a frame 78 with a plurality of conveying elements, such as rollers 80, rotatably held between the sides of the frame 78. As used herein, the term "roller" refers to conventional, cylindrical rollers, or wheels rotatably mounted in the frame.

Figure 3G:
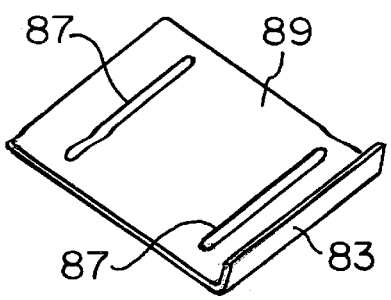
Figure 3H:
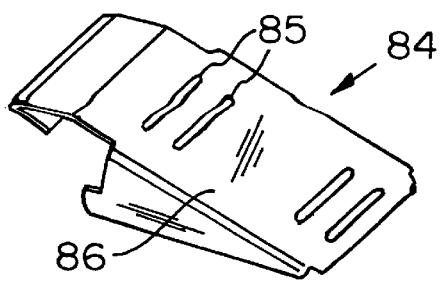

As shown in FIGS. 1, 3G, and 3H, a work shelf 82, preferably an extensible work shelf, can be carried on the front 14 of the frame 12 by one or more shelf brackets 84. Each shelf bracket 84 is configured to engage a top of a beam 36 and has a sloping top surface 86 onto which the work shelf 82 can be placed. The shelf brackets 84 have bores or slots 85 which align with bores or slots 87 in the expandable work shelf 82 such that the work shelf 82 can be held in place by conventional fastening devices, such as bolts or nuts. The work shelf 82 itself can be formed from two similar, substantially L-shaped shelf pieces 89 (one of which is shown in FIG. 3G), with one piece 89 slidable in or on another piece 89 such that the overall length of the work shelf 82 can be adjusted. For example, one shelf piece 89 can be placed on top of another shelf piece 89 such that the slots 87 in the two shelf pieces 89 align. The relative position of the two shelf pieces 89 can be selectively locked in any conventional manner, such as by a threaded bolt passing through the aligned slots 89 and held in place by a wing nut. The work shelf 82 (i.e., the shelf pieces 89) can have a flange 83 to prevent totes sliding off of the work shelf 82 as described in more detail below.

Figure 3I:
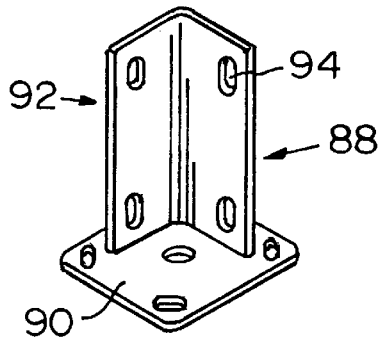
Figure 3J:
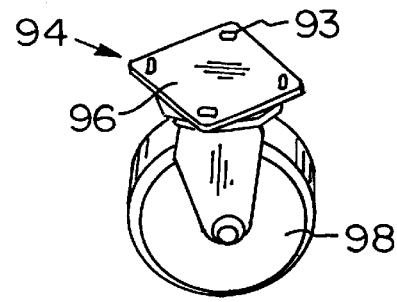

As shown in FIGS. 1, 2, and 3I, a foot 88 can be attached to the bottom of each leg 22. Each foot 88 preferably has a base 90 with a substantially L-shaped attachment piece 92 extending from the base 90. The attachment piece 92 has either slots, bores, or similar attachment devices 91 such that the foot 88 can be attached to the bottom of a leg 22, such as by headed bolts. A caster assembly 94 can be attached to the foot 88. As shown in FIG. 3J, the caster assembly 94 includes a base 96 having either slots or similar engagement devices 93 which are connectable with The base 90 on the foot 88. The caster assembly 94 also includes a rotatable wheel 98.

Operation of the auxiliary conveyor 10 will now be described.

If additional or different parts are to be supplied to a workstation on a production line, the auxiliary conveyor 10 of the invention can be used to adjustably and reconfigurably supply these parts to the worker. For example, if one to three conveyor lanes are needed, the auxiliary conveyor 10 can be constructed as follows. A first or bottom front beam 36 can be engaged with the left and right front legs 22 of the frame 12 by engaging the engagement members 56 of the beams 36 with the attachment elements 30 of the legs 22. As shown in FIGS. 2 and 5, the left side of the load beam 36 can be positioned such that the engagement members 56 engage the attachment elements 30 of the right front leg 22. The head of the engagement member 56 can be passed through the large area of the eye-slot and then pushed downwardly such that the post engages the small area of the eye-slot so that the beam 36 cannot be pulled out of the slot. The position, i.e., the height, of the bottom load beam 36 above the floor is selected based on the ergonomics or height desired by the worker at the workstations. To maintain the beam 36 in the retracted position, one or more of the locking devices 54 can be engaged on the beam 36. For example, the shaft of a threaded bolt can be extended through a bore 46 in the outer member 38 and through an aligned slot 52 on the inner member 40. A wing nut can then be attached to the threaded shaft and tightened so that the inner and outer members 40, 38 are not slidable with respect to each other to fix the overall length of the beam 36.

A second or upper front beam 36 can be attached to the front legs 22 above the lower front beam 36 in similar manner. The height of the upper front beam 36 can again be selected by the worker at the workstation.

In similar manner, rear beams 36 can be attached to the rear legs 22. The height of the rear beams 36 on the rear legs 22 depends on whether the upper conveyor lanes and lower conveyor lanes to be formed by adjacent conveyor tracks 76 are desired to deliver parts to the workstation or direct them away. For example, in the structure shown in FIG. 1, the upper rear beam 36 is located higher on the frame 12 than the upper front beam 36 so that the tipper conveyor lanes (upper conveyor path slant toward the front 14 of the frame 12, meaning that the parts on the upper conveyor lanes will be delivered under the force of gravity from the back 16 of the frame 12 to the front 14 of the frame 12. Likewise, the lower front beam 36 is positioned higher than the lower rear beam 36 so that the lower conveyor lanes (lower conveyor path) slope away from the workstation so that the container in which the parts were delivered can be directed away from the workstation on the lower conveyor lanes. However, it is to be understood that the relative heights of the front and rear beams 36 can be selected to direct the parts in any desired manner. For example, the heights of the front and rear beans 36 can be selected such that the lower conveyor path slants toward the front 14 of the conveyor 10; or such that both the upper and lower conveyor paths slant toward the front 14; or such that both the conveyor paths slant toward the back 16. Further, while only two conveyor paths are shown in FIG. 1, it is to be understood that the invention is not limited to this embodiment. Any desired number of conveyor paths can be formed by adding or removing pairs of front and rear beams is 36 to form any desired number of conveyor paths or levels.

One or more side rails 60 can be connected between the front and rear pairs of legs 22 on the left ad right sides 18, 20 of the frame 12 by engaging the engagement members 64 of the side rails 60 with the attachment elements 30 on the legs 22.

With the front and rear beams 36 at the desired position, the track brackets 70 can be placed on the beams 36, with the fingers 74 directed towards the interior of the frame 12. The U-shaped channel 72 keeps the track brackets 70 in place on the beams 36. With the track brackets 70 in place, one or more conveyor tracks 76 can be placed into the frame 12 between the front and back beams 36 to form one or more upper and/or lower conveyor lanes, as shown in FIG. 1. The frame 78 of the conveyor track 76 engages the fingers 74 on the track brackets 70. In a currently preferred embodiment, one pair of track brackets 70 can be used to hold two adjacent conveyor tracks 76.

The work shelf 22 may optionally be connected to the frame by placing two or more shelf bracket 84 onto the upper, front beam 36 as shown in FIG. 1. With the shelf brackets 84 in place, the extensible work shelf 82 can then be connected to the shelf brackets 84 by conventional fastening means, such as nuts and bolts.

If desired, the caster assemblies 94 can be connected to the legs 22 by first connecting a foot 88 to the bottom of a leg 22, for example, by bolts and wing nuts. Next, the caster assembly 94 can be attached to the foot 88 by connecting the caster assembly base 96 with the foot base 90, such as by nuts and bolts.

With the auxiliary conveyor 10 thus assembled, parts can be delivered to the workstation by placing the pans in containers and loading the containers onto a selected one of the conveyor tacks 76 at the back of the auxiliary conveyor 10 (in the embodiment shown in FIG. 1 this would be one of the upper conveyor tracks 76). The containers can be differently colored or numbered or have other indicia indicating what parts are included. The containers move under the force of gravity alone the conveyor tracks 76 until they reach the work shelf 82. The flange 83 prevents the container from falling off of the front of the work shelf 82. The operator can remove parts from one or more of the selected containers until the container is empty and then place the empty container onto one of the discharge tracks, e.g., in FIG. 1 this would be one of the conveyor tracks 76 immediately below the upper conveyor track 76 on which the container was supplied. The empty container would then move under the force of gravity to the back of the conveyor 10 where it can be removed and reloaded.

However, should the requirements for the type or number of parts to the workstaton differ, the auxiliary conveyor 10 of the invention can be expanded, i.e., the number of conveyor tracks 76 can be increased. In order to expand the auxiliary conveyor 10, the locking devices 54 on each of the front and rear beams 36 are disengaged, such as by unthreading the threaded bolt from the wing nut and removing the bolt. The two U-shaped inner and outer members 40, 38 can then be slid apart, e.g., by sliding the inner member 40 away from the outer member 38 to extend the length of the beam 36. When the desired length has been reached, the locking devices 54 are reengaged, such as by heading the threaded bolt through the inner and outer U-shaped members 40, 38 (through the bores 46 and slots 52) and then tightening the wing nut to hold each of the beams 36 in the extended position. Additional track brackets 70 can then be engaged to the top of opposing beams 36 and additional conveyor tracks 76 added to form additional upper and/or lower conveyor lanes. If the work shelf 82 is present, the fastening members of the work shelf 82 can be disengaged such that the length of the work shelf 82 expands as the sides of the frame 12 are moved away from each other.

On the other hand, if the auxiliary conveyor 10 is in an expanded position, the locking devices 54 of the beams 36 can be disengaged and the frame width decreased by pushing the left and right sides towards each other such that the inner U-shaped member 40 slides into the outer U-shaped member 38 to decrease the overall width of the frame 12. When the new or desired length is achieved, the locking devices 54 can be reengaged.

Additionally, the length of the conveyor 10 can be adjusted by replacing the side rails 60 with longer or shorter side rails 60 as desired. Of course, the conveyor tracks 76 would also be replaced with longer or shorter conveyor tracks 76 to accommodate the new length of the conveyor 10. Alternatively, if the side rails 60 are extensible as described above, the locking devices on the side rails 60 can be disengaged, the side rails 60 extended or retracted to a new desired length, and the locking devices reengaged. Again, new conveyor tracks 76 corresponding to the new length of the conveyor 10 would replace the old conveyor tracks 76.

Alternatively, the conveyor 10 can be disassembled by disconnecting or removing the conveyor tracks 76, track brackets 70, optional shelf brackets 84, optional work shelf 82, load beams 36, and side rails 60. For example, with the configuration described above, the load beams 36 can be disengaged from the legs 22 by pushing or striking upwardly on the ends of the beams 36 to disengage the post of the engagement member 56 from the slot 34 of the attachment element 30 and then pulling the engagement member 56 through the larger diameter area 32.

The components described above to form the conveyor 10 can be provided as a single unit or as a kit with selected pans provided as desired by a purchaser. Alternatively, the components to form a conveyor 10 of particular dimensions can be initially purchased and then additional (different) components of differing sizes (e.g., different lengths of side rails or conveyor tracks) can subsequently be purchased to permit changing or adjusting the dimensions of the initially purchased conveyor.

Thus, the present invention provides a simple and easy method of supplying parts to a workstation in a changing production environment. The number of conveyor tracks of the auxiliary conveyor is easily reconfigurable simply by adjusting the length of the beams to accommodate more or less conveyor tracks. This expandability or adjustability decreases the life cycle cost of the invention.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A conveyor, comprising:
   a frame having a first side and a second side;
   at least one extensible and retractable support extending between the first and second sides such that a distance between the first and second sides is selectively adjustable; and
   at least one conveyor track removably carried on the frame,
   wherein the conveyor includes:
      a pair of spaced apart front legs and a pair of spaced apart back legs;
      a plurality of front extensible and retractable supports extending between and releasably connected to the front legs;
      a plurality of back extensible and retractable supports extending between and releasably connected to the rear legs;
      at least one track bracket removably carried on at least one of the front and back supports; and
      at least one conveyor track releasably engaged with the track brackets such that the front and back supports and conveyor tracks form a plurality of conveyor lanes.

2. The conveyor according to claim 1, including a work shelf removably mounted on the at least one support.

3. A conveyor, comprising:
   a frame having a first side and a second side;
   at least one extensible and retractable support extending between the first and second sides such that a distance between the first and second sides is selectively adjustable; and
   at least one conveyor track removably carried on the frame,
   wherein each side includes at least one extensible and retractable side rail such that the length of the frame is adjustable.

4. An auxiliary conveyor, comprising:

a frame having a pair of spaced apart front legs and a pair of spaced apart back legs, each leg having at least one attachment element;

at least one extensible and retractable front support extending between the front legs and at least one extensible and retractable back support extending between the back legs, wherein each extensible support includes at least one engagement member configured to releasably engage an attachment element on one of the legs such that the positions of the front and back extensible and retractable supports between the legs is adjustable;

at least one conveyor track removably mounted on the conveyor frame;

at least one side rail extending between each pair of front and back legs, wherein each side rail includes at least one engagement member configured to releasably engage an attachment element on one of the legs; and at least one track bracket removably located on the at least one front support and on the at least one back support, with the at least one conveyor track releasably engaged with the track brackets, wherein the track bracket includes a first portion releasably engageable with a support and a second portion releasably engageable with the conveyor track.

5. The conveyor according to claim 4, wherein the attachment elements comprise eye-slots.

6. An auxiliary conveyor, comprising:

a frame having a pair of spaced apart front legs and a pair of spaced apart back legs, each leg having at least one attachment element;

at least one extensible and retractable front support extending between the front legs and at least one extensible and retractable back support extending between the back legs, wherein each extensible support includes at least one engagement member configured to releasably engage an attachment element on one of the legs such that the positions of the front and back extensible and retractable supports between the legs is adjustable;

at least one conveyor track removably mounted on the conveyor frame;

at least one side rail extending between each pair of front and back legs, wherein each side rail includes at least one engagement member configured to releasably engage an attachment element on one of the legs; and an extensible and retractable work shelf extending between the front legs.

7. The conveyor according to claim 6, wherein the conveyor includes at least one shelf bracket releasably engageable with one of the supports, with the work shelf engaged with the shelf bracket.

8. An auxiliary conveyor, comprising:

a frame having a pair of spaced apart front legs and a pair of spaced apart back legs, each leg having at least one attachment element;

at least one extensible and retractable front support extending between the front legs and at least one extensible and retractable back support extending between the back legs, wherein each extensible support includes at least one engagement member configured to releasably engage an attachment element on one of the legs such that the positions of the front and back extensible and retractable supports between the legs is adjustable;

at least one conveyor track removably mounted on the conveyor frame; and at least one side rail extending between each pair of front and back legs, wherein each side rail includes at least one engagement member configured to releasably engage an attachment element on one of the legs, wherein each side rail comprises an extensible and retractable member.

9. An auxiliary conveyor, comprising:

a frame having a pair of spaced apart front legs and a pair of spaced apart back legs, each leg having at least one attachment element;

at least one extensible and retractable front support extending between the front legs and at least one extensible and retractable back support extending between the back legs, wherein each extensible support includes at least one engagement member configured to releasably engage an attachment element on one of the legs such that the positions of the front and back extensible and retractable supports between the legs is adjustable;

at least one conveyor track removably mounted on the conveyor frame; and at least one side rail extending between each pair of front and back legs, wherein each side rail includes at least one engagement member configured to releasably engage an attachment element on one of the legs, wherein the attachment elements comprise eye-slots, and wherein the engagement members comprise a post having a head.

10. A conveyor, comprising:

a frame having a pair of spaced apart front legs and a pair of spaced apart back legs, each leg having a plurality of attachment elements;

a plurality of extensible and retractable front supports extending between and releasably engageable with the front legs, each front support including at least one engagement member at each end configured to releasably engage an attachment element on one of the front legs;

a plurality of extensible and retractable back supports extending between and releasably engageable with the back legs, each back support including at least one engagement member at each end configured to releasably engage an attachment element on one of the back legs;

at least one side rail extending between and releasably engageable with each pair of front and rear legs;

at least one track bracket releasably engaged with each front and back support; and at least one conveyor track extending between each pair of front and back supports to form a plurality of conveyor paths.

* * * * *